C. L. BARDWELL.
ENGINE AND CAR STARTER.
APPLICATION FILED APR. 12, 1915.
1,189,420.
Patented July 4, 1916.
2 SHEETS—SHEET 1.
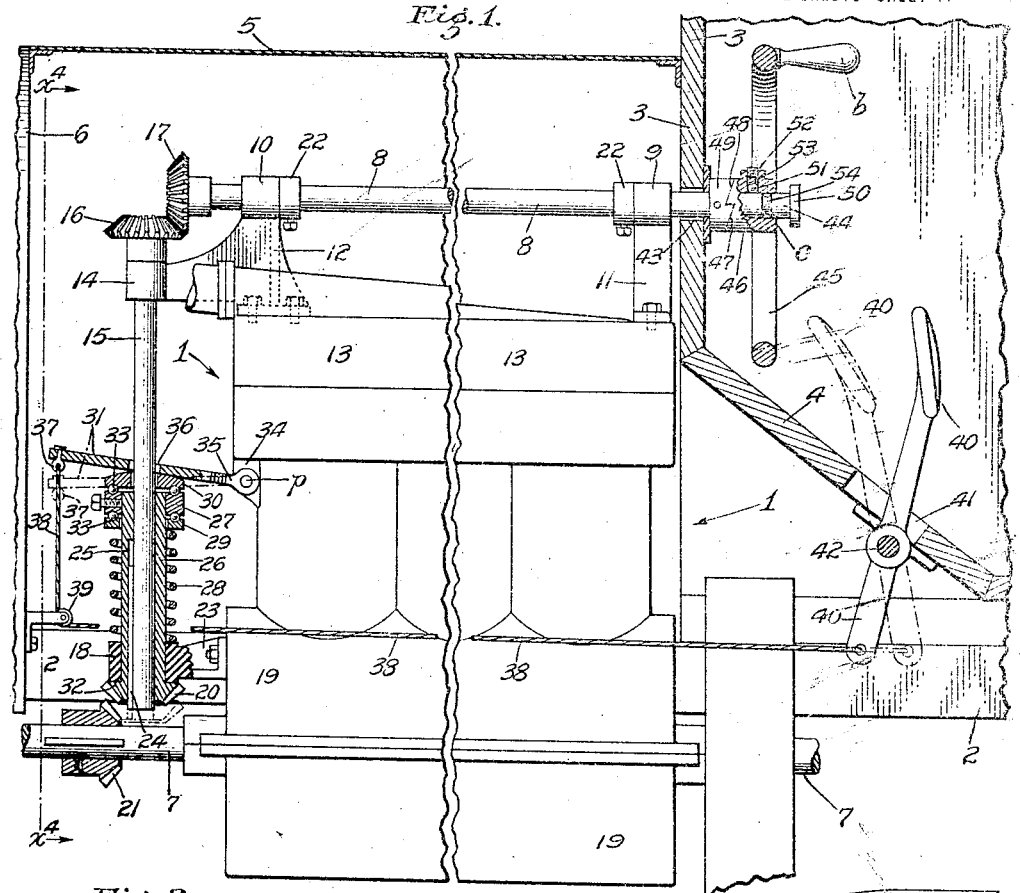
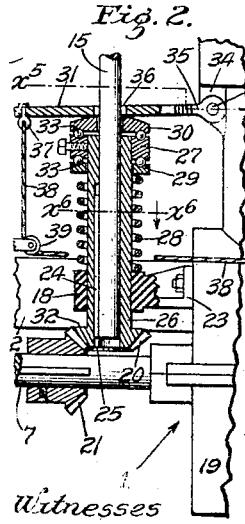
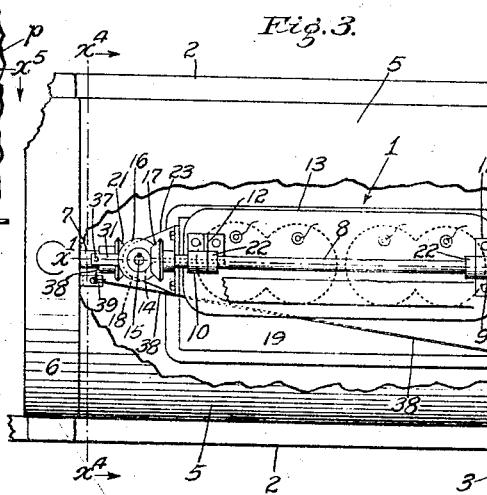
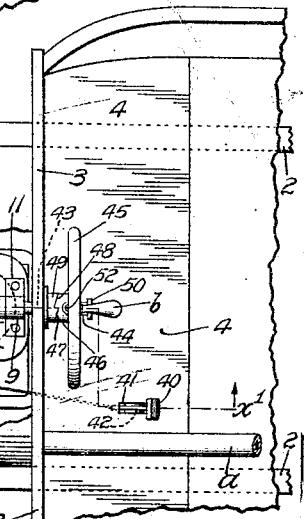
Witnesses
H. N. Kirkby
Estella Townsend
Inventor
Chester L. Bardwell
by James R. Townsend
his atty

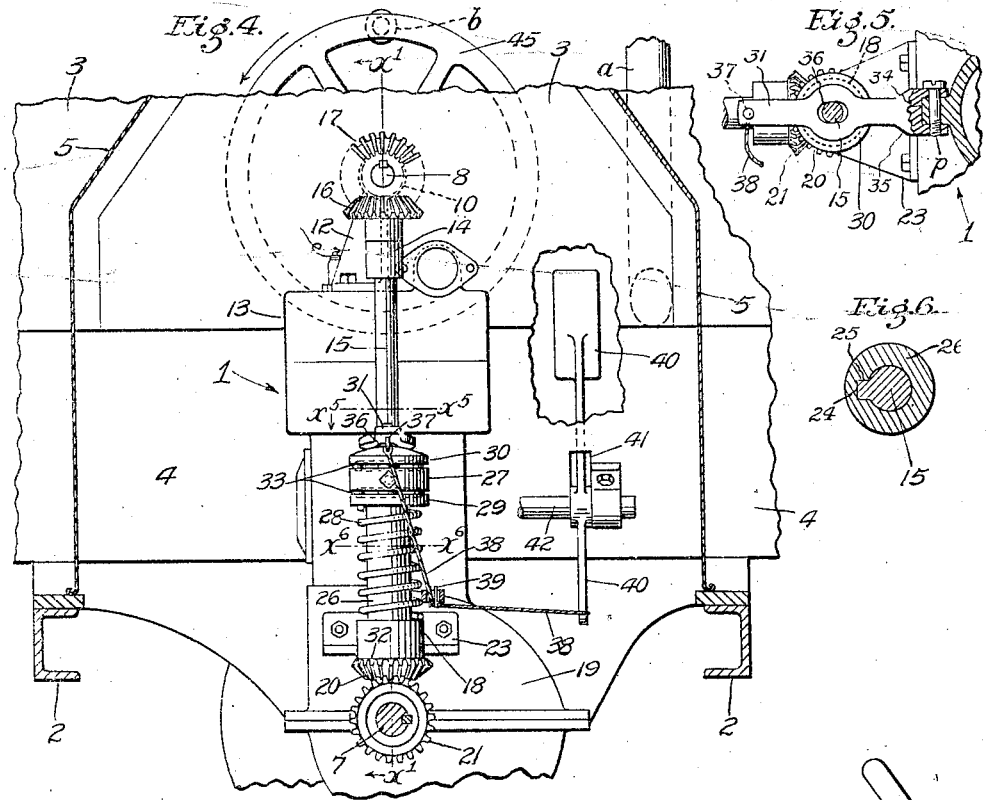

UNITED STATES PATENT OFFICE.

CHESTER LEON BARDWELL, OF LOS ANGELES, CALIFORNIA, ASSIGNOR OF ONE-HALF TO CHARLES HERMAN FRAZEL, OF LOS ANGELES, CALIFORNIA.

ENGINE AND CAR STARTER.

1,189,420.

Specification of Letters Patent.

Patented July 4, 1916.

Application filed April 12, 1915. Serial No. 20,958.

*To all whom it may concern:*

Be it known that I, CHESTER LEON BARDWELL, a citizen of the United States, residing at Los Angeles, in the county of Los Angeles and State of California, have invented a new and useful Engine and Car Starter, of which the following is a specification.

This invention is applicable to motor-cars for turning the engine crank shaft from the seat of a motor-car either for starting purposes, or to afford means for manually propelling the motor-car.

An object of the invention is to provide a practical, compact, cheap, simple and effective engine starter for an internal combustion engine which can be readily installed upon the engine and operated from the dash of the motor-car and which will at the same time allow the engine crank shaft to extend through to the front of the car where it may be turned by the ordinary front crank in case it is desired.

Another object of the invention is the provision of a manual auxiliary drive that may be operated from the driver's seat to propel the motor-car for short distances and thus afford ready and convenient means to manually move the motor-car out of the way of traffic in case the engine goes dead upon a crowded thoroughfare.

The invention comprises improved operating mechanism connected with the motor-car engine whereby the engine shaft may be turned from the seat of the motor-car, said mechanism comprising a driving connection extending from the dash to the engine shaft and adapted to be moved into commission to drive said engine shaft by means of a foot pedal or the like adjacent the driver's seat and crank means operatable upon the dash to turn said driving connection.

The invention may be carried out in various forms without departing from the spirit thereof and includes the parts and combinations of parts herein set forth and claimed in the appended claims.

The accompanying drawings illustrate the invention.

Figure 1 is a broken, fragmental, elevation partly in section on line $x^1$—$x^1$, Figs. 3 and 4 illustrating a form of the invention as applied to a motor-car engine. Solid lines show parts of the operating mechanism in normal non-operative position with the crank means in engagement to turn the driving connection when thrown into commission, and dot and dash lines indicate parts in operative position with the driving connection in commission. Fig. 2 is a fragmental, sectional view analogous to Fig. 1 showing the driving connection in commission to drive the engine shaft, corresponding to dot and dash lines of Fig. 1. Fig. 3 is a fragmental, reduced plan view showing the invention applied. The engine hood is broken away for clearness of illustration. Fig. 4 is a broken, fragmental, front elevation viewed from line $x^4$—$x^4$, Figs. 1 and 3, the driving connection being out of commission corresponding to solid lines of Fig. 1. Fig. 5 is a fragmental plan section viewed from line $x^5$—$x^5$, Figs. 2 and 4. Fig. 6 is a cross section on line $x^6$—$x^6$, Figs. 2 and 4, showing the feathered construction of the sliding gear. Fig. 7 is a view illustrating another form in which the invention may be embodied.

The engine 1 may be of any preferred type used for motor-cars and is mounted in the usual manner upon the frame 2 in front of the motor-car dash 3 and sloping footboard 4 and has the usual engine-hood 5 extending from the dash to the radiator 6.

Referring now to Figs. 1 to 6 inclusive, the driving mechanism to turn the engine shaft 7 from the dash 3, in the present instance includes the longitudinal shaft 8 extending forwardly from the dash and above the engine, said shaft being journaled in bearings 9, 10 of brackets 11, 12 respectively that are suitably secured to the head 13 of the engine. The end bracket 12 is also provided with an extension bearing 14 to journal the upper end of a front upright shaft 15 arranged in front of the engine and connected with shaft 8 by bevel gears 16, 17 respectively. Alined with said extension bearing 14 is a lower bearing 18 secured to the crank case 19 of the engine to journal the lower end of said shaft 15 upon which is slidably mounted an actuating gear 20 arranged to slide back and forth upon said shaft and move into and out of position to mesh with a gear 21 fixed upon the engine shaft 7 just outside of the crank case 19. By this arrangement the crank shaft is permitted to extend forwardly under the shaft 15 and radiator 6 and be turned from the front of the car in the usual manner when the necessity arises as in case of disarrangement of parts.

The hub of the gear 16 rests upon the bearing 14 to thus support the bevel gear 16 in meshing position with the gear 17 that in turn is positioned in place by set collars 22 upon the shaft 8 adjacent the bearings 9 and 10.

The longitudinal shaft 8 may be arranged centrally of the engine as shown in the drawings or may be positioned at one side thereof, in which latter case the upright front shaft 15 will lie aslant of the vertical, longitudinal mid-plane of the engine. It will be understood that the positioning and arrangement of the shafts 8 and 15 will vary according to the construction of the different engines to which the device is applied.

The lower portion of the upright shaft 15 is provided with a feather 24 adapted to seat in a feather key-way 25 in a sleeve 26 carrying the actuating gear 30, by which feathered construction the gear 20 is slidably mounted upon the rotatable shaft 15. The slidable sleeve 26 is journaled in the bearing 18 of the front bracket 23 thus to journal the lower end of the shaft 15, and the gear of said sleeve is positioned below the bearing and adapted to move into mesh with the gear 21 as the sleeve slides downwardly in the bearing and on the shaft. Upon the upper end of the sleeve 26 above the bearing is fixed an operating collar 27, rotating with the gear and sleeve, between which collar and the bearing 18 is mounted a retracting spring 28 that is coiled around the sleeve and has its upper extremity bearing against a thrust collar 29 and its lower extremity seating upon the bearing 18, said spring being effective to exert an upward pressure upon the sleeve collar 27, through the thrust collar 29, to normally hold the gear 20 out of mesh with the engine shaft gear 21. A thrust collar 30 is positioned on top of the rotatable collar 27 to receive the thrust from an operating lever 31 by means of which lever the sliding gear 20 is moved downwardly into mesh with said gear 21 against the opposition of the spring 28.

The upward movement of the sliding gear is limited by the upper gear face 32 which abuts against the lower face of the bearing 18, when said gear is up out of commission.

As will be readily understood the collars 29 and 30 do not rotate, and antifriction balls 33 are provided between the rotating collar 27 and the stationary collars 29 and 30 to relieve the friction between said rotating collar and non-rotating collars.

A lug 34 is suitably mounted upon the engine, in the instance shown being cast integral therewith, to which is pivoted at $p$ the forked extremity 35 of the lever 31 that is provided with a slot-like aperture 36 through which the shaft 15 extends. Said lever rests upon the thrust collar 30 and has at its free end an eye 37 to which is attached an operating connection as a cable 38 passing around a guide 39 supported, in the instance shown, from the rear of the radiator 6, said cable 38 extending back to a foot-pedal 40 that extends through a slot 41 in the sloping foot board 4 and is loosely mounted upon a pedal shaft 42 which may be the standard pedal shaft for mounting the usual motor-car operating pedals, not shown, adjacent the steering post $a$.

The foot pedal 40, cable 38 and lever 31 afford means to move the driving connection into commission to drive the engine shaft, said cable being actuated by depressing the pedal 40 to draw down the lever 31 and slide the feathered gear 20 into mesh with the engine shaft gear 21, whereupon parts are in operative position to turn the engine shaft through upright shaft 15 and longitudinal shaft 8. For this purpose the rear end of the longitudinal shaft 8 projects through the dash at 43 and terminates in an extension 44 on the driver's side of the dash upon which extension is mounted crank means, as a hand-wheel 45 preferably provided with a crank handle $b$. Said hand-wheel has a hub 46 rotatably and slidably mounted upon the extension 44, see Fig. 1, said hub being provided with clutch teeth 47 upon its front face adapted to engage with clutch teeth 48 of a clutch collar 49 that is fixed to the shaft extension 44 adjacent the dash, the tooth engagement occurring whenever the hand-wheel is moved forwardly along said extension for that purpose. The backward movement of the hand-wheel to disengage said teeth is limited by the rear face $c$ of the hub 46 which face abuts against a terminal shoulder 50 of the shaft extension, said shoulder being spaced a sufficient distance from the collar 49 to permit disengagement of the teeth when the hand-wheel hub is in position against said shoulder.

In order to minimize the physical force required to actuate the driving connection from the seat of the car, I yieldingly lock the hand-wheel back out of engagement with the clutch collar 49, which permits free and unrestrained movement of the hand-wheel along the shaft extension to engage with the clutch collar when the locking means is out of commission, so that the hand-wheel may be maintained in engagement with the clutch collar without any spring opposition as is the case with an ordinary spring retracted crank.

The yielding locking means comprise a spring-pressed ball 51 mounted in a chambered pocket 52 in the hub 46, which ball under the pressure of the spring 53 is adapted to ride into an annular groove 54 in the shaft extension 44 whenever the hand-wheel is moved back against the shoulder 50. When force is applied by the operator to move the hand-wheel forwardly away from the shoulder the ball 51 will ride out of the annular groove against the compression of the spring 53, whereupon the hand-wheel is unrestrained and free to be moved into engagement with the clutch collar.

In the form shown in Fig. 7 the longitudinal shaft 8' of the driving connection is supported at its rear end by trunnion pins 55 of a bearing block 56, said trunnion pins being mounted in the bracket 11'. The front end of said shaft 8' is supported in a bearing block 57 that is slidably mounted in a U shaped bracket 12', said bearing block having the extension bearing 14' to support the upper end of the front shaft 15' that is connected with the longitudinal shaft by bevel gears 16', 17'. The lower end of said front shaft is slidably mounted in the bearing 18' and has the gear 20' fixed thereto below said bearing which shaft, in this form, is adapted to slide back and forth in the bearing 18' to move the gear 20' into and out of mesh with the gear 21. The operating collar 27', in this instance, is secured to the shaft 15' and has the similar ball bearing collars 29 and 30, retracting spring 28 interposed between bearing 18' and collar 29, and pivoted operating lever 31 connected to the foot pedal 40, as in Figs 1 to 6; by means of which lever and collars the shaft 15' is moved downwardly in this case, in opposition to the spring 28, to mesh the gear 20' with the engine shaft gear 21. Upon this slight downward movement of the shaft 15' the lower abutting hub face 58 of the gear 16' acts upon the extension bearing 14' to move the slide block 57 down in the bracket 12' and slightly tilt the front end of the shaft 8' downwardly about the trunnion pins 55, the angular relation of the gears 16' and 17' changing slightly to accommodate this movement.

In practical operation when it is desired to operate the device either for self-starting purposes or to manually propel the motor-car, the foot-pedal is depressed by the foot of the operator, as indicated by dot and dash lines in Fig. 1, to throw the gear 20 into mesh with the engine shaft gear 21 in opposition to the spring 28, see Fig. 2, whereupon the driving connection is in commission to turn the engine shaft by the dash hand-wheel 45 from the driver's seat, not shown. Continued depression of the foot-pedal will maintain the driving connection in mesh while turning the hand-wheel to drive the engine shaft, the spring 28 acting to retract said driving connection and throw the same out of commission when the foot pressure is removed from the pedal.

When the device is used as an engine starter, the collar teeth 48 will run ahead of the hub teeth 47 as the engine gains speed under its own power which acts in the usual manner to throw the hand-wheel back against the shoulder 50 where it is yieldingly locked out of engagement with the clutch collar. The foot-pedal may then be released allowing the spring 28 to throw the driving connection out of commission, said spring being also effective to return the foot pedal to normal position.

When the device is to be utilized as an auxiliary drive to propel the car, the foot-pedal is operated to throw the driving connection 8, 15 and 20, into commission while the motor-car is in gear with the engine, whereupon the car may be manually propelled by the hand-wheel as when it becomes desirable to move out of the way of crowded traffic in case the engine cannot be immediately started.

I claim:

1. The combination with a motor-car having a dash and an engine shaft, of a driving connection extending from the dash to the engine shaft, said driving connection having a dash extension, means to move said driving connection into commission to drive said engine shaft, a clutch collar on the dash extension adjacent the dash, a crank mounted on said dash extension and adapted to move into engagement with the clutch collar to turn the driving connection, said dash extension being provided with an annular groove rearwardly of the clutch collar, and a spring pressed ball mounted in the crank and adapted to ride into said annular groove to thereby yieldingly lock the crank out of engagement with the clutch collar.

2. In a motor-car, the combination with a foot-board, an engine and an engine shaft, of a gear on the engine shaft, a longitudinal shaft positioned above the engine, an upright shaft positioned in front of the engine and connected with said longitudinal shaft, a sliding gear upon the lower end of said upright shaft and adapted to mesh with said engine shaft gear, spring means to normally hold said sliding gear up out of mesh, an operating lever pivotally mounted upon the engine and provided with an aperture through which said upright shaft extends, said levers swinging downwardly on said shaft to move the sliding gear down into mesh to drive the engine shaft in opposition to said spring means, and a foot pedal mounted upon the foot-board to actuate said lever.

3. In a motor-car the combination with a foot-board, an engine and an engine shaft; of a gear on the engine shaft; a longitudinal shaft supported above the engine; an upright shaft supported in front of the engine and connected with said longitudinal shaft; a sleeve provided with an actuating gear, said sleeve being slidable upon the lower end of said upright shaft to move the actuating gear into mesh with said engine shaft gear; a collar on the sleeve; a spring supported from the engine and coiled around the sleeve, said spring bearing against the collar to normally uphold the sleeve and maintain the actuating gear out of mesh; an operating lever pivotally mounted upon the engine and adapted to move the sleeve down in opposition to said coiled spring and thereby move the actuating gear into mesh; and a foot-pedal mounted upon the foot-board to actuate said lever.

4. In a motor car the combination with a foot-board, an engine and an engine shaft; of a gear on the engine shaft; a longitudinal shaft supported above the engine; an upright shaft supported in front of the engine and connected with said longitudinal shaft; a bearing mounted upon the front of the engine to maintain the lower end of said upright shaft in vertical alinement; a sleeve slidable on the shaft and in the bearing; an actuating gear on the sleeve below the bearing, said gear being adapted to mesh with said engine shaft gear; a collar on the sleeve above the bearing; a spring supported upon the bearing and coiled around the sleeve, said spring exerting an upward pressure against the collar to normally uphold the sleeve and maintain the actuating gear out of mesh; an operating lever pivotally mounted upon the engine and extending over the sleeve, said lever being adapted to move the sleeve down in opposition to said coiled spring and thereby move the actuating gear into mesh; and a foot-pedal mounted upon the foot-board to actuate said lever.

5. In combination with an engine shaft, of a bevel gear on said shaft, a bevel gear to mesh with said first-named gear, crank means, a longitudinal shaft extending in parallelism with the engine shaft, an upright shaft connected with the second-named bevel gear, a bevel gear connection for said longitudinal shaft and said upright shaft, means to normally hold the first two bevel gears out of commission, and pedal means adjacent the crank means connected to move the first two bevel gears into commission.

In testimony whereof, I have hereunto set my hand at Los Angeles, California, this 6th day of April, 1915.

CHESTER LEON BARDWELL.

In presence of—
 JAMES R. TOWNSEND,
 WILLIAM N. KIRKBY.